(12) United States Patent
Melanson et al.

(10) Patent No.: US 9,713,206 B2
(45) Date of Patent: Jul. 18, 2017

(54) LED (LIGHT-EMITTING DIODE) STRING DERIVED CONTROLLER POWER SUPPLY

(71) Applicant: PHILIPS LIGHTING HOLDING B.V., Eindhoven (NL)

(72) Inventors: John L. Melanson, Austin, TX (US); Eric King, Dripping Springs, TX (US); Rahul Singh, Austin, TX (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 14/801,440

(22) Filed: Jul. 16, 2015

(65) Prior Publication Data

US 2015/0327339 A1   Nov. 12, 2015

Related U.S. Application Data

(62) Division of application No. 14/220,472, filed on Mar. 20, 2014, now Pat. No. 9,161,401.

(51) Int. Cl.
*H05B 37/00* (2006.01)
*H05B 39/00* (2006.01)
(Continued)

(52) U.S. Cl.
CPC ....... *H05B 33/0815* (2013.01); *H05B 33/083* (2013.01); *H05B 33/0824* (2013.01);
(Continued)

(58) Field of Classification Search
CPC ............ H05B 33/0815; H05B 33/0827; H05B 33/083; H05B 37/02; Y02B 20/346; Y02B 20/347; Y02B 20/345
(Continued)

(56) References Cited

U.S. PATENT DOCUMENTS 4,683,529 A   7/1987 Bucher
5,014,178 A   5/1991 Balakrishnan
(Continued)

FOREIGN PATENT DOCUMENTS

CN   1292598 A   4/2001
CN   201025693 Y   2/2008
(Continued)

OTHER PUBLICATIONS

U.S. Appl. No. 14/220,472, filed Mar. 20, 2014, Melanson, et al.
(Continued)

*Primary Examiner* — Alexander H Taningco
*Assistant Examiner* — Christian L Garcia

(57) ABSTRACT

An LED lighting device includes an auxiliary power supply that supplies power to a control circuit of the LED lighting device that receives an input from a terminal of a light-emitting diode (LED) string of the lighting device that has a substantially lower voltage than the line voltage to which the lighting device is connected. The terminal may be within the LED string, or may be an end of the string. A linear regulator may be operated from the voltage drop across a number of the LEDs in the string so that the energy wasted by the auxiliary power supply is minimized. In other designs, the auxiliary power supply may be intermittently connected in series with the LED string only when needed. The intermittent connection can be used to forward bias a portion of the LED string when the voltage supplied to the LED string is low, increasing overall brightness.

18 Claims, 8 Drawing Sheets

(51) Int. Cl.
*H05B 41/00* (2006.01)
*H05B 33/08* (2006.01)
*H05B 39/04* (2006.01)
*H05B 41/28* (2006.01)
*H05B 41/282* (2006.01)
*H05B 37/02* (2006.01)

(52) U.S. Cl.
CPC ....... *H05B 33/0845* (2013.01); *H05B 39/047* (2013.01); *H05B 41/28* (2013.01); *H05B 41/2827* (2013.01); *H05B 33/0827* (2013.01); *H05B 37/02* (2013.01); *Y02B 20/345* (2013.01); *Y02B 20/346* (2013.01); *Y02B 20/347* (2013.01)

(58) Field of Classification Search
USPC .................... 315/186, 185 R, 291, 307, 224
See application file for complete search history.

(56) References Cited

U.S. PATENT DOCUMENTS

| | | |
|---|---|---|
| 5,319,301 A | 6/1994 | Callahan et al. |
| 5,321,350 A | 6/1994 | Haas |
| 5,479,333 A | 12/1995 | McCambridge et al. |
| 5,581,453 A | 12/1996 | Ueta et al. |
| 5,770,928 A | 6/1998 | Chansky et al. |
| 5,812,383 A | 9/1998 | Majid et al. |
| 5,812,385 A | 9/1998 | Leu |
| 5,834,858 A | 11/1998 | Crosman et al. |
| 5,874,725 A | 2/1999 | Yamaguchi |
| 5,880,942 A | 3/1999 | Leu |
| 5,901,051 A | 5/1999 | Takahashi |
| 6,043,635 A | 3/2000 | Downey |
| 6,125,046 A | 9/2000 | Jang et al. |
| 6,134,123 A | 10/2000 | Yamada |
| 6,160,724 A | 12/2000 | Hemena et al. |
| 6,181,114 B1 | 1/2001 | Hermena et al. |
| 6,369,525 B1 | 4/2002 | Chang et al. |
| 6,643,144 B2 | 11/2003 | Feldtkeller |
| 6,646,848 B2 | 11/2003 | Yoshida et al. |
| 6,839,247 B1 | 1/2005 | Yang et al. |
| 6,842,353 B2 | 1/2005 | Yamada et al. |
| 6,912,140 B2 | 6/2005 | Kasai et al. |
| 6,963,496 B2 | 11/2005 | Bimbaud |
| 6,980,446 B2 | 12/2005 | Simada et al. |
| 7,012,818 B2 | 3/2006 | Kotsuji et al. |
| 7,064,531 B1 | 6/2006 | Zinn |
| 7,099,163 B1 | 8/2006 | Ying |
| 7,106,603 B1 | 9/2006 | Lin et al. |
| 7,136,292 B1 | 11/2006 | Chan et al. |
| 7,184,937 B1 | 2/2007 | Su et al. |
| 7,221,128 B2 | 5/2007 | Usui et al. |
| 7,345,458 B2 | 3/2008 | Kanai et al. |
| 7,352,595 B2 | 4/2008 | Yang et al. |
| 7,394,668 B2 | 7/2008 | Nakajima |
| 7,394,670 B2 | 7/2008 | Koike |
| 7,468,896 B2 | 12/2008 | Gong et al. |
| 7,606,532 B2 | 10/2009 | Wuidart |
| 7,684,223 B2 | 3/2010 | Wei |
| 7,843,017 B2 | 11/2010 | Cheng |
| 8,008,898 B2 | 8/2011 | Melanson et al. |
| 8,031,494 B2 | 10/2011 | Brkovic |
| 8,169,803 B2 | 5/2012 | Huang et al. |
| 8,279,631 B2 | 10/2012 | Yang |
| 8,305,001 B2 | 11/2012 | Horiuchi et al. |
| 8,325,502 B2 | 12/2012 | Gaombanco et al. |
| 8,379,414 B2 | 2/2013 | Huang et al. |
| 8,461,818 B1 | 6/2013 | Benes |
| 2003/0174520 A1 | 9/2003 | Bimbaud |
| 2004/0240233 A1 | 12/2004 | Disney |
| 2005/0088862 A1 | 4/2005 | Shimada et al. |
| 2006/0126368 A1 | 6/2006 | Rapeanu |
| 2006/0285365 A1 | 12/2006 | Huynh et al. |
| 2007/0103134 A1 | 5/2007 | Yang et al. |
| 2007/0159856 A1 | 7/2007 | Yang |
| 2008/0101098 A1 | 5/2008 | Disney |
| 2008/0304293 A1 | 12/2008 | Spiridon et al. |
| 2009/0135632 A1 | 5/2009 | Sohma |
| 2009/0190379 A1 | 7/2009 | Melanson et al. |
| 2010/0213859 A1 | 8/2010 | Shteynberg et al. |
| 2010/0271850 A1 | 10/2010 | Huang et al. |
| 2010/0309689 A1 | 12/2010 | Coulson |
| 2010/0327838 A1 | 12/2010 | Melanson |
| 2011/0018590 A1 | 1/2011 | Tai et al. |
| 2013/0038242 A1 | 2/2013 | Athalye |
| 2013/0147380 A1* | 6/2013 | Chobot .................... 315/210 |
| 2013/0200812 A1* | 8/2013 | Radermacher et al. ...... 315/186 |
| 2014/0015421 A1 | 1/2014 | Mituyasu et al. |
| 2014/0361623 A1* | 12/2014 | Siessegger ......... H05B 33/0803 307/64 |
| 2014/0361696 A1* | 12/2014 | Siessegger ......... H05B 33/0803 315/186 |

FOREIGN PATENT DOCUMENTS

| | | |
|---|---|---|
| DE | 10001394 A1 | 7/2001 |
| EP | 0585789 A | 3/1994 |
| EP | 1289107 A3 | 5/2003 |
| GB | 2468239 B | 9/2010 |
| WO | WO 2007016373 A3 | 2/2007 |
| WO | WO 2010035155 A2 | 4/2010 |

OTHER PUBLICATIONS

Amanci, et al., Synchronization System with Zero-Crossing Peak Detection Algorithm for Power System Applications, 2010 International Power Electronics Conference, pp. 2984-2991, 2010.
Beaty, et al. (Eds.), Standard Handbook for Electrical Engineers, 15th Edition, pp. 1-3, 2007, New York City, New York, USA.
Kim, et al., "A Low Cost Multiple Current-Voltage Concurrent Control for Smart Lighting Applications", IECON 2011—37th Annual Conference on IEEE Industrial Electronics Society; IEEE Nov. 7, 2011, pp. 2866-2871, Department of Electrical Engineering, Hyang University, Seoul, Korea.
Hu, et al., "Mathematical Modeling of Cross-Regulation Problem in Flyback Converters", 32nd Annual IEEE Power Electronics Specialists Conference; 2001 Conference Proceedings: Vancouver, Canada; IEEE; Jun. 17, 2001; pp. 2072-2077; Delta Power Electronics Center, Shanghai P. R. China.
Mammano, Bob, "Current Sensing Solutions for Power Supply Designs", pp. 1-36, 2001.
Wang, Meizhong, "Understandable Electric Circuits", Institution of Engineering , 2010, London, United Kingdom.
Zhang, et al., "A Novel Single Stage Power Factor Correction Scheme with Time-Multiplexing Control", Proceedings of the International Conference on Industrial Electronics Control and Instrumentation: Taipei, Taiwan; IEEE; Nov. 5, 2007; pp. 1432-1437; School of Electrical and Information Engineering; The University of Sydney.
International Search Report and Written Opinion in PCT/US2015/016469, mailed on May 11, 2015, 11 pages (pp. 1-11 in pdf).
Power Integrations, TOP200-4/14 TOPSwitch Family Three-Terminal Off-Line PWM Switch, Product Datasheet, Power Integrations, Inc., Jul. 1996, XP002524650, San Jose, CA, USA url: http://www.datasheet4u.com/download.ph p?id=311789.

* cited by examiner

LED (LIGHT-EMITTING DIODE) STRING DERIVED CONTROLLER POWER SUPPLY

The present U.S. Patent Application is a Division of U.S. patent application Ser. No. 14/220,472, filed on Mar. 20, 2014, and claims priority thereto under 35 U.S.C. §121.

BACKGROUND OF THE INVENTION

1. Field of the Invention

The present invention relates generally to lighting device power sources such as those included within light-emitting diode (LED) lamps, and in particular to a control circuit for an LED lighting device power source that is powered from a LED string controlled by the control circuit.

2. Background of the Invention

Lighting control and power supply integrated circuits (ICs) are in common use in both electronic systems and in replaceable consumer lighting devices, e.g., light-emitting-diode (LED) and compact fluorescent lamp (CFL) replacements for traditional incandescent light bulbs.

In order to power LED lighting device from a typical AC power line voltage, the AC power line voltage must somehow be reduced to the relatively low voltage required by the LEDs in the lighting device. One manner in which the reduction is accomplished is to connect the LEDs in series to form a string, which is then supplied from a greater supply voltage. The greater supply voltage is generally provided from a switching power converter that controls the current provided to the LED string and also generally performs some voltage conversion to an intermediate voltage supplied to the LED string. The control circuits that operate the switching power supply typically also require a power supply voltage much less than the voltage of the AC line voltage. The power supply voltage is typically generated from a linear power supply. Generating the controller power supply voltage from the typical linear power supply wastes energy and adds some complexity to the circuit.

Therefore, it would be desirable to provide a LED lighting device that has improved energy efficiency and/or reduced complexity.

SUMMARY OF THE INVENTION

A control circuit for controlling power supplied to one or more lighting devices, an integrated circuit ("IC") for controlling such a circuit and a method of operation of the circuit provide improved efficiency, reduced complexity and/or other benefits in LED lighting devices.

The circuit includes a switching power converter with a magnetic storage element and a switching element for controlling the current supplied to one or more strings of light-emitting diodes (LEDs) from a line voltage input source. The circuit supplies power to a control circuit that controls the switching element of the switching power converter from a terminal of the LED string, which may be a terminal within the LED string, or a terminal at the end of the LED string. The terminal has a voltage substantially less than a voltage of the input voltage source, so that the LED string provides at least a portion of the voltage drop from the voltage of the AC line source to the power supply input of the control circuit.

The foregoing and other objectives, features, and advantages of the invention will be apparent from the following, more particular, description of the preferred embodiment of the invention, as illustrated in the accompanying drawings.

DESCRIPTION OF ILLUSTRATIVE EMBODIMENT

The present disclosure reveals circuits and methods for powering and controlling strings of series-connected light-emitting diodes (LEDs), in which auxiliary power for control circuits that control a switching power supply within a lighting device including the LEDs is provided from an LED string itself. In particular embodiments, strings of light-emitting diodes (LEDs) are packaged to replace incandescent lamps. A power supply voltage is supplied or generated from a terminal of an LED string within the lighting device, which may be a terminal within the LED string, or an end of the LED string. Since the voltage provided from the terminal is substantially greater than a voltage provided from the rectified AC line voltage at the input of the switching power supply, energy that would otherwise be wasted in producing the auxiliary power supply voltage is conserved.

Figure 1:
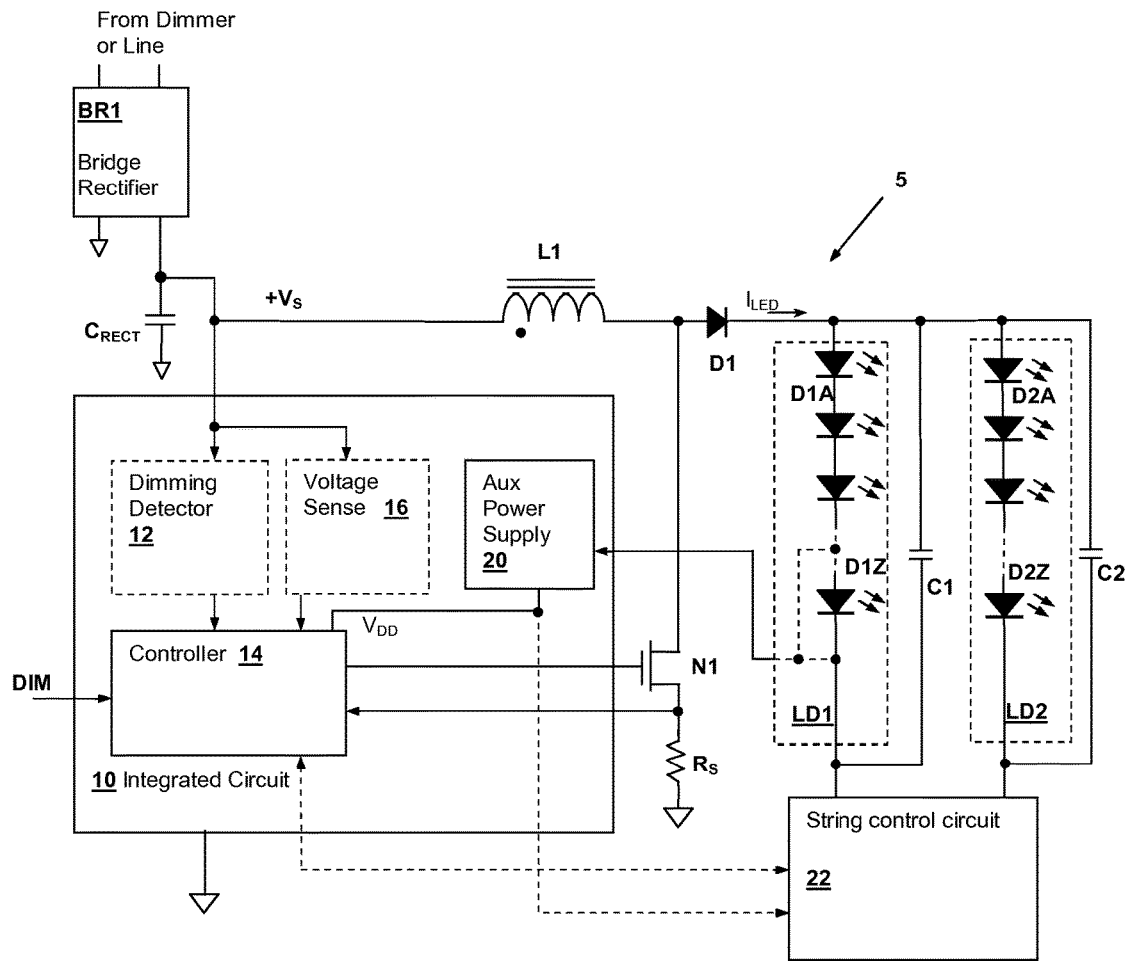
FIG. 1 is a block diagram depicting an exemplary lighting circuit.

Referring now to FIG. 1, an exemplary lighting circuit 5 is shown. An inductor L1 provides a magnetic storage element from which energy is supplied to a first lighting device LD1 and a second lighting device LD2 from a rectified line voltage source +$V_s$. Rectified line voltage source +$V_s$ is filtered to remove high frequency noise by capacitor $C_{RECT}$ and provided from a bridge rectifier BR1 that is connected to a circuit that is, through a dimmer or directly, coupled to an AC line voltage circuit. Lighting devices LD1 and LD2 in the depicted embodiment are strings of series connected light-emitting diodes (LEDs) D1A-D1Z in lighting device LD1 and LEDs D2A-D2Z in lighting device LD2. Lighting circuit 5 uses a boost converter topology to provide a current $I_{LED}$ through one or both of lighting devices LD1 and LD2. The voltage across lighting devices LD1 and LD2 is smoothed by capacitors C1 and C2, respectively. During a charging phase, a switching transistor N1 is activated to store energy in inductor L1 by conducting current through inductor L1. Transistor N1 is activated by a controller circuit 14 that is operated from the input power supply voltage +$V_s$. After the energy in inductor L1 has reached the appropriate level, controller circuit 14 deactivates transistor N1, causing a boost flyback conduction through diode D1 and one or both of the LED strings within lighting devices LD1 and LD2, depending on whether a string control circuit 22 allows current to return from lighting devices LD1 and LD2 to ground. The energy level in inductor L1 can be determined by the current through inductor L1, which can be determined by detecting a voltage across sense resistor $R_s$ that is provided to controller circuit 14. Synchronization signals provided between string control circuit 22 and controller circuit 14 may be coupled directly, or isolated by a coupling capacitor or transformer and may originate at either string control circuit 22 or controller circuit 14.

An integrated circuit (IC) 10 includes controller circuit 14 to operate switching transistor N1, which is illustrated as external to IC 10, but that alternatively may be included within IC 10. Controller circuit 14 may be a pulse-width modulator, or other suitable controller capable of controlling the amount of energy transferred by inductor L1, by the activation of switching transistor N1. The value may be controlled according to dimming values DIM, which may be provided by a source internal or external to integrated circuit 10 and may, alternatively or in combination, be optionally determined by a dimming detection circuit 12 that detects a dimming level of a dimmer controlling the line voltage from which power supply voltage $+V_s$ is derived. A voltage sense circuit 16 can be provided to further inform controller circuit 14 of the magnitude of power supply voltage $+V_s$. An auxiliary power supply 20 provides auxiliary power supply voltage $V_{DD}$ to internal circuits of integrated circuit 10, in particular to controller circuit 14 which only needs to generate sufficient output voltage swing to fully turn on switching transistor N1. In the examples given herein, various circuits that produce auxiliary power supply voltage $V_{DD}$ from a terminal of the LED string formed by LEDs D1A-D1Z within lighting device LD1 are shown. The terminal may be a terminal within the LED strings, or an end of the LED string, as shown. The voltage at the terminal has a substantially lower voltage, e.g., 12V-15V than the voltage across capacitor C1, e.g., 40V, so that energy is saved by not dissipating power that would otherwise be wasted by regulating auxiliary power supply voltage $V_{DD}$ to the lower voltage.

Figure 2:
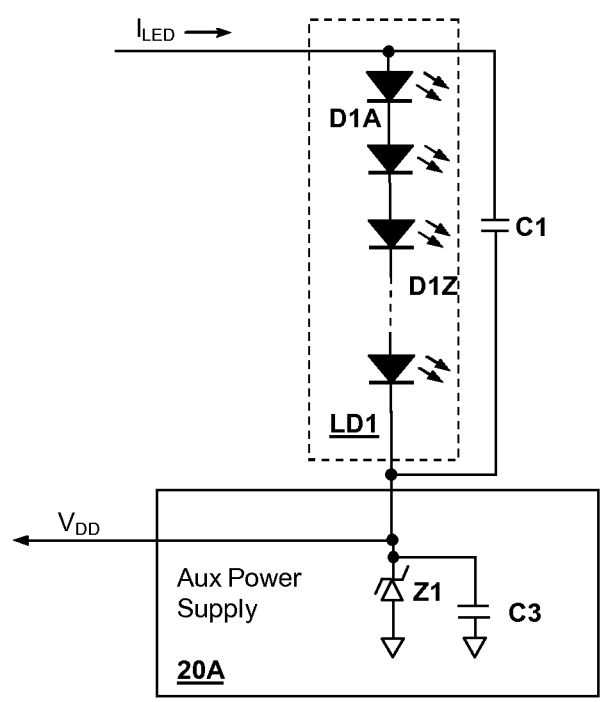
FIG. 2 is a simplified schematic diagram showing an auxiliary power supply circuit that can be used in the lighting circuit of FIG. 1.

Referring now to FIG. 2, an exemplary auxiliary power supply circuit 20A and associated topology are shown. Auxiliary power supply circuit 20A is in the form of a linear regulator provided by a Zener diode Z1 that has a Zener voltage, such that the desired 12V-15V value for auxiliary power supply voltage $V_{DD}$ is produced at an output terminal. A filter capacitor C3 is provided to remove high-frequency components from auxiliary power supply voltage $V_{DD}$. In auxiliary power supply circuit 20A, all of the current $I_{LED}$ conducted through LEDs D1A-D1Z passes through one of the loads connected to auxiliary power supply voltage $V_{DD}$ or through Zener diode Z1. However, efficiency is improved in the depicted topology, since the voltage drop from the power supply input to the cathode of Zener diode Z1 is provided across (and illuminates) LEDs D1A-D1Z, rather than through a lossy device such as a resistor or transistor.

Figure 3:
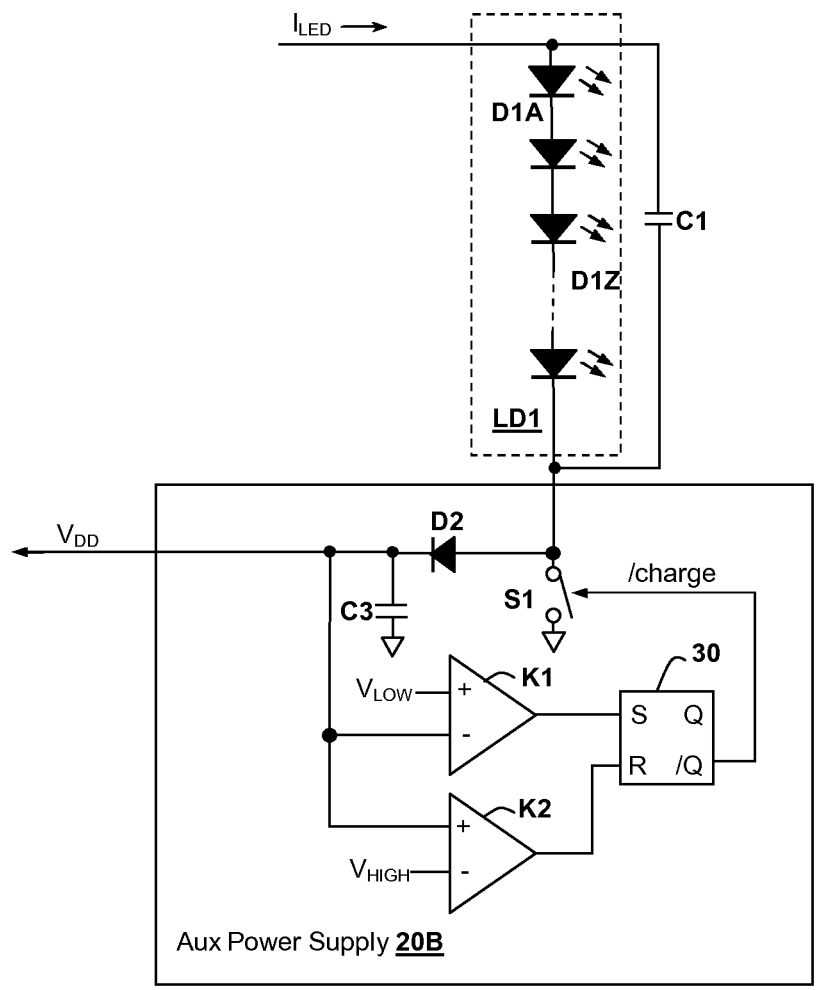
FIG. 3 is a simplified schematic diagram showing another auxiliary power supply circuit that can be used in the lighting circuit of FIG. 1.
Figure 4:
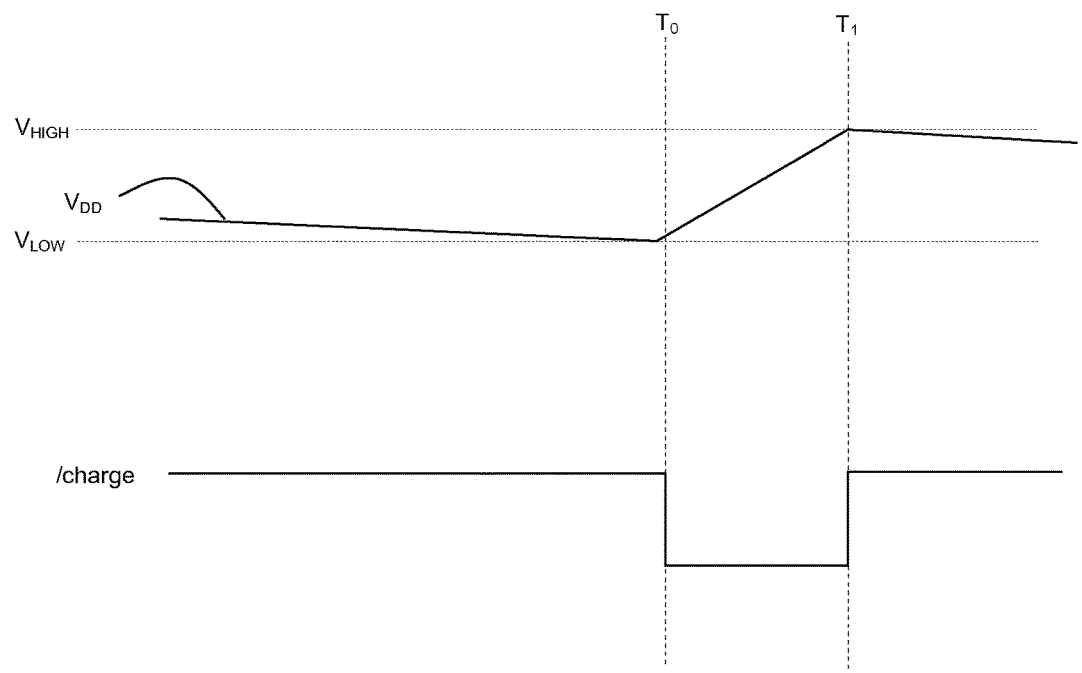
FIG. 4 is a signal waveform diagram illustrating signals within the auxiliary power supply circuit of FIG. 3.

Referring now to FIG. 3, another exemplary auxiliary power supply circuit 20B and associated topology are shown. Auxiliary power supply circuit 20B is in the form of a hysteretic regulator that alternately shunts current $I_{LED}$ through a switch S1 except when a control signal /charge provided from flip-flop 30 indicates, when de-asserted, that the value of auxiliary power supply voltage $V_{DD}$ has dropped below a lower threshold voltage $V_{LOW}$ as detected by comparator K1. Comparator K1 has an output that, when asserted, sets flip-flop 30 to re-set control signal /charge, causing switch S1 to open until flip-flop 30 is reset by the output of comparator K2 indicating that auxiliary power supply voltage $V_{DD}$ has risen above a higher threshold voltage $V_{HIGH}$. FIG. 4 shows signals within the auxiliary power supply circuit 20B during operation. When switch S1 is in an open switching state, which occurs when the voltage across filter capacitor C3 falls below lower threshold voltage $V_{LOW}$ at time $T_0$ as illustrated in FIG. 4, current $I_{LED}$ is directed through a diode D2 to charge filter capacitor C3 until the voltage across filter capacitor C3 has risen above higher threshold voltage $V_{HIGH}$ at time $T_1$, causing switch S1 to be set to a closed switching state. Comparator K1 and flip-flop 30 thus operate to control switch S1 by alternatively changing the switching state of S1 to regulate auxiliary power supply voltage $V_{DD}$. Exemplary values of lower threshold voltage $V_{LOW}$ and higher threshold voltage $V_{HIGH}$ are 12V and 15V, respectively. In auxiliary power supply circuit 20B, efficiency is improved to an even greater degree than in auxiliary power supply circuit 20A of FIG. 2, in that all of the voltage drop across LEDs D1A-D1Z and auxiliary power supply 20B either charges filter capacitor C3 or illuminates LEDs D1A-D1Z.

Figure 5:
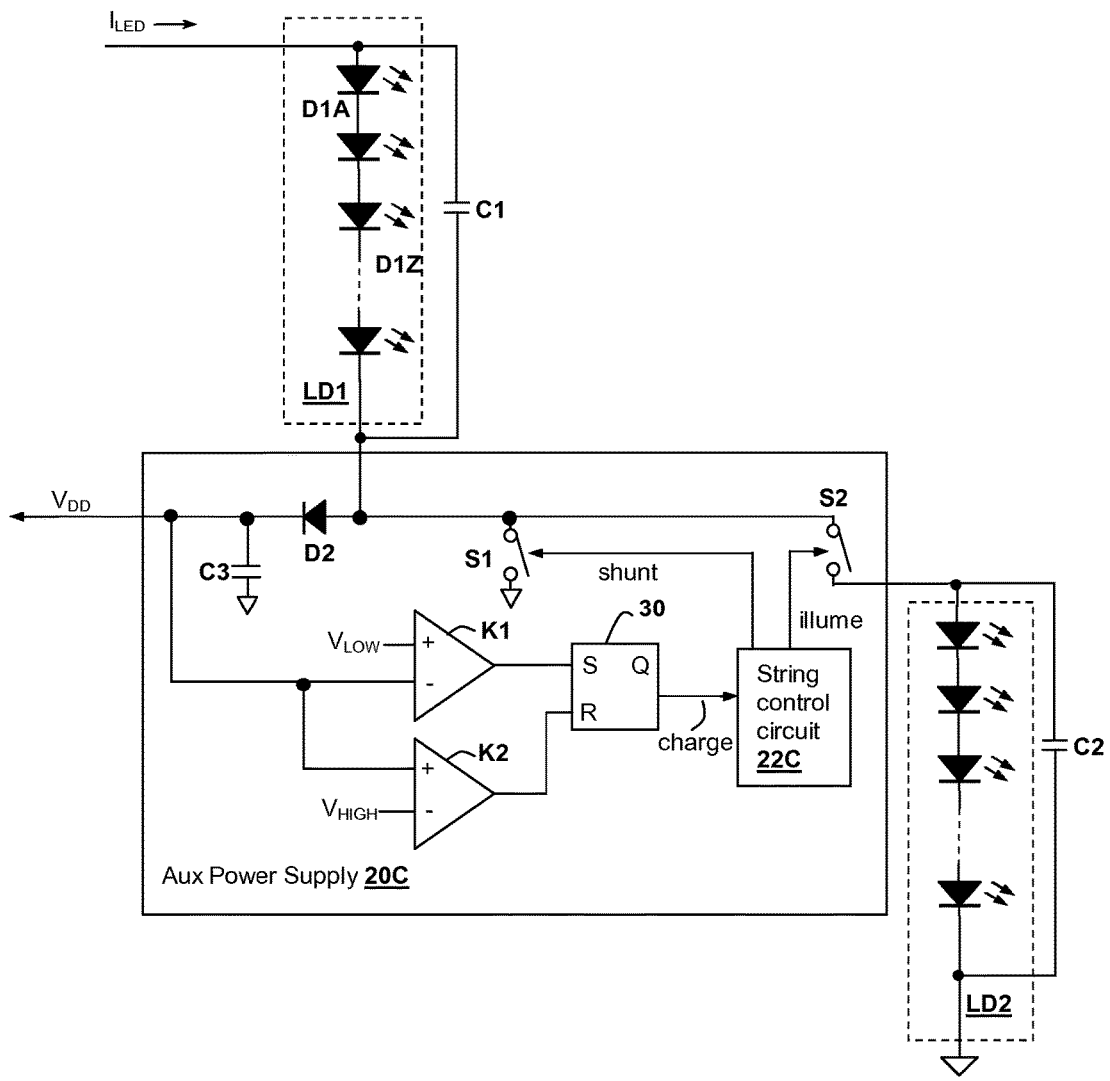
FIGS. 5-7 are simplified schematic diagrams showing other auxiliary power supply circuits that can be used in the lighting circuit of FIG. 1.

Referring now to FIG. 5, another exemplary auxiliary power supply circuit 20C and associated topology are shown. Auxiliary power supply circuit 20C is similar to auxiliary power supply circuit 20B of FIG. 3, in that auxiliary power supply circuit 20C is in the form of a hysteretic regulator. Therefore, only differences are described below. Auxiliary power supply circuit 20C, alternately shunts current $I_{LED}$ through switch S1 or through another switch S2, depending on an internal state of string control circuit 22C which asserts control signal illume to turn on switch S2 if lighting device LD2 is to be activated, passing current $I_{LED}$ through lighting device LD2, and alternatively asserts control signal shunt to direct current $I_{LED}$ to ground. Depending on the amount of intensity needed from lighting device LD2, control signal illume may only be activated for a portion of a cycle. As in auxiliary power supply circuit 20B of FIG. 3, when a control signal charge indicates that the value of auxiliary power supply voltage $V_{DD}$ has dropped below a lower threshold voltage $V_{LOW}$ as detected by comparator K1 and until the voltage across filter capacitor C3 has risen above higher threshold voltage $V_{HIGH}$ as detected by comparator K2, auxiliary power supply circuit 20C asserts control signal charge, causing string control circuit 22C to de-assert control signal shunt and control signal illume in order to charge filter capacitor C3 through diode D2. The de-assertion of control signal shunt and control signal illume may be synchronized so that if control signal illume is only to be asserted for a portion of the cycle and control signal charge has been asserted, auxiliary power supply circuit 20C postpones action in response to control signal charge so that only control signal shunt is de-asserted while charging filter capacitor C3. Lighting device LD2 may, for example, be an amber LED string that is generally operated at a lower intensity than lighting device LD1 and is provided to "soften" the light provided from lighting device LD1.

Figure 6:
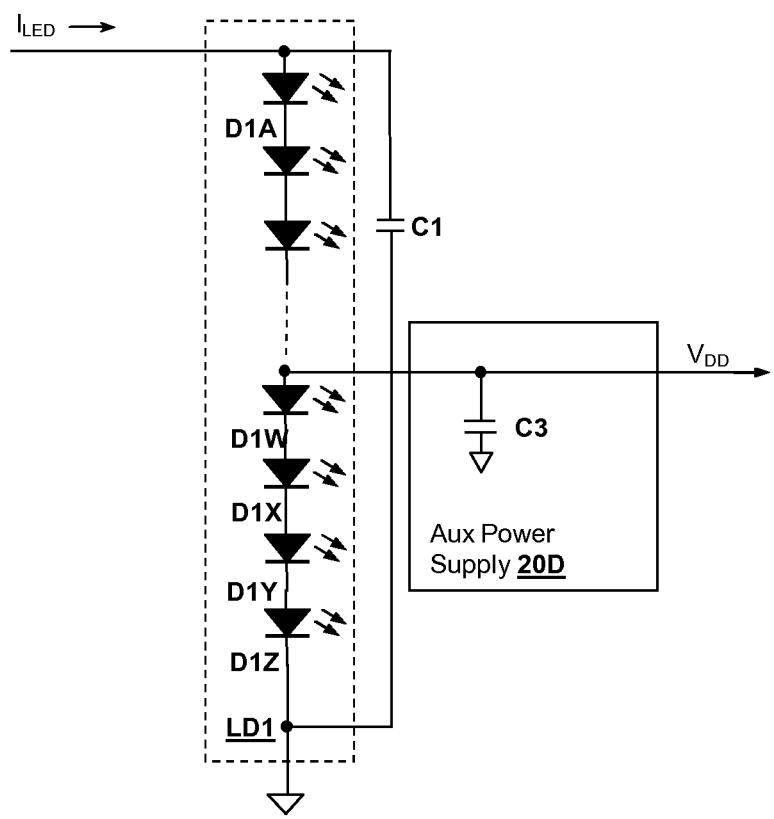

Referring now to FIG. 6, another exemplary auxiliary power supply circuit 20D and associated topology are shown. Auxiliary power supply circuit 20D provides auxiliary power supply voltage $V_{DD}$ directly from a terminal of lighting device LD1, from which any high-frequency noise is filtered by filter capacitor C3. The terminal of the LED string formed by LEDs D1A-D1Z is chosen to provide the required value of auxiliary power supply voltage $V_{DD}$, which in the example is provided from the voltage drop across four LEDs D1W, D1X, D1Y and D1Z, which should yield an auxiliary power supply voltage $V_{DD}$ of between 12V and 14V for LEDs that are generally used for illumination.

Figure 7:
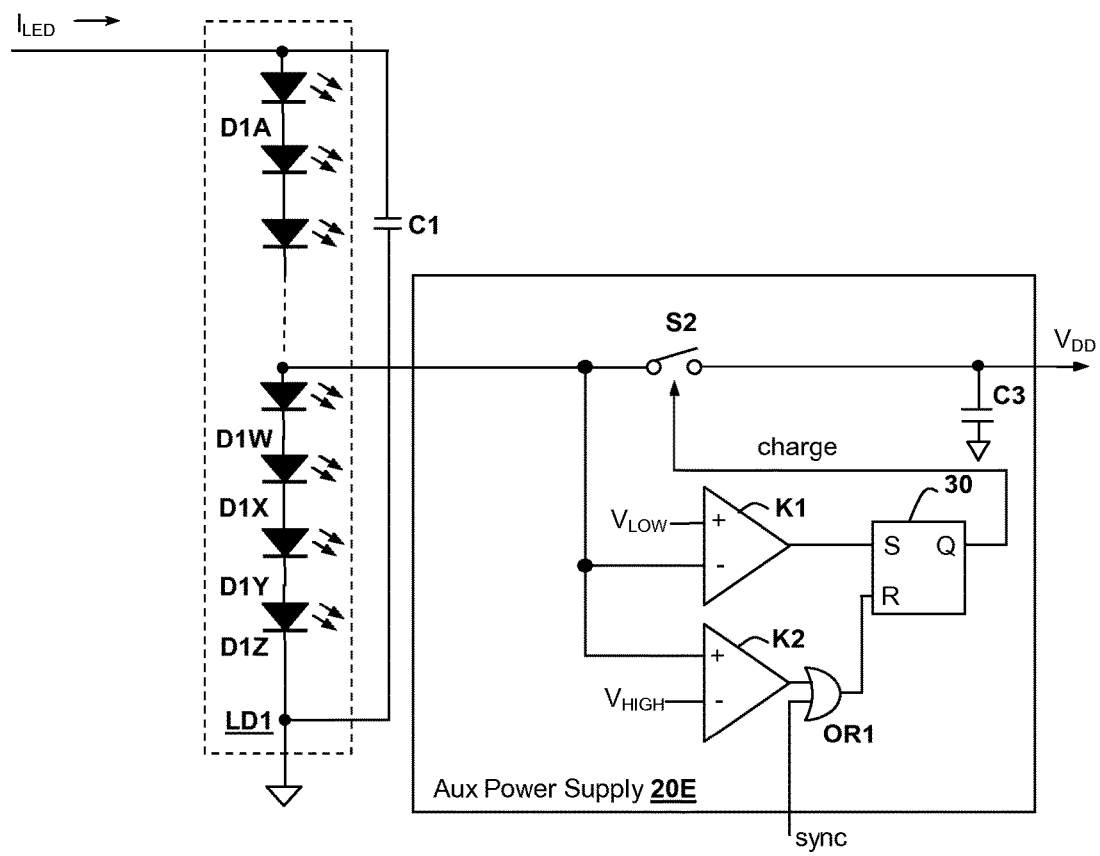
Figure 8:
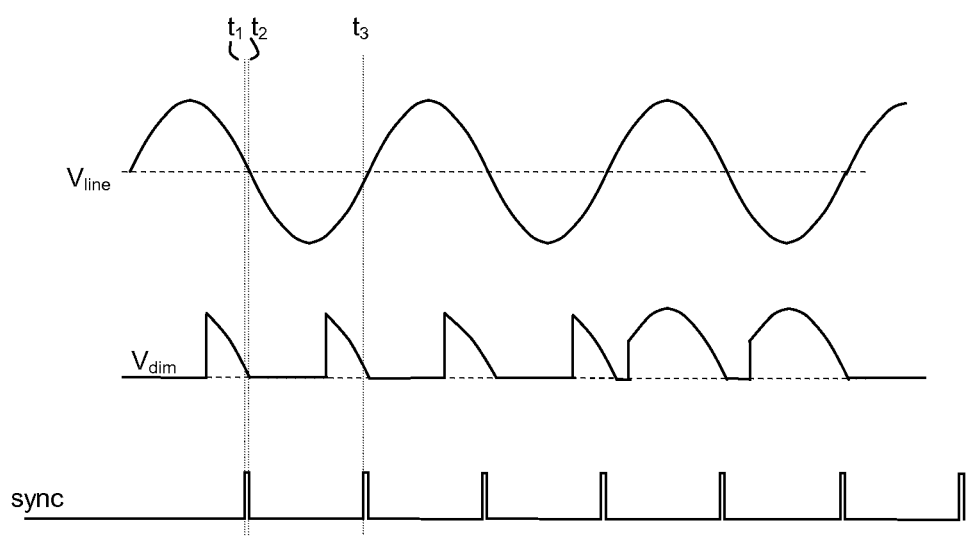
FIG. 8 is a timing diagram illustrating signals within a lighting circuit incorporating auxiliary power supply 20E of FIG. 7.

Referring now to FIG. 7, another exemplary auxiliary power supply circuit 20E and associated topology are shown. Auxiliary power supply circuit 20E is similar to auxiliary power supply circuit 20D of FIG. 6, except that auxiliary power supply circuit 20E also includes a hysteretic regulator similar to that provided in auxiliary power supply circuit 20B as shown in FIG. 3. Therefore, only differences are described below. In exemplary auxiliary power supply circuit 20E, rather than shunting current $I_{LED}$ through a switch when not charging filter capacitor C3, exemplary auxiliary power supply circuit 20E uses control signal charge to activate a switch S2 only when filter capacitor C3 requires charging, thereby only disrupting current $I_{LED}$ when auxiliary power supply voltage $V_{DD}$ has dropped below a lower threshold voltage $V_{LOW}$ as detected by comparator K1. The effect of activating switch S2 is to divert current from LEDs D1W, D1X, D1Y and D1Z, which would tend to decrease the intensity of those LEDs while filter capacitor C3 is charging. However, logical-OR gate OR1 can be optionally provided to synchronize the activation of flip-flop 30 so that control signal charge is only asserted when control signal sync is not asserted. Control signal sync, which can be provided from voltage sense circuit 16 of FIG. 1, has a waveform as illustrated in FIG. 8 and is inactive only at the end of the active period when the voltage across capacitor C1 may have dropped to a voltage at which the LED string within lighting device LD1 is likely to have lost forward bias, i.e., between times $t_1$ and $t_2$, then starting again at time $t_3$. Thus, the charging of filter capacitor C3 can be used beneficially to even the intensity produced by lighting device LD1. In the example depicted in FIG. 8, voltage $V_{dim}$ is a leading-edge-cut dimmed voltage provided to bridge rectifier BR1 of FIG. 1, but control signal sync can also be timed with the beginning of the half-cycles of AC line voltage $V_{LINE}$ for trailing-edge-cut dimmer outputs, or at the beginning and/or end of the half-cycles of AC line voltage $V_{LINE}$ for applications in which AC line voltage $V_{LINE}$ is provided directly to bridge rectifier BR1 or when dimming detector 12 of FIG. 1 detects that voltage $V_{dim}$ is not cut (100% intensity). Control signal sync can be activated based on particular timing or voltage level of the input voltage waveform ($V_{dim}$ or $V_{LINE}$).

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A lighting circuit, comprising:
    a plurality of sets of series-connected light-emitting diodes (LEDs), wherein a first LED set of one or more of the LEDs includes a first terminal coupled between an input voltage source terminal and an auxiliary power supply terminal and a second LED set of one or more of the LEDs includes a current input terminal and a ground terminal;
    a switching power converter having a magnetic energy-storing element and a switching element for controlling a current supplied through the plurality of series connected light-emitting diodes;
    a control circuit for controlling the switching element of the switching power converter, wherein:
        the control circuit includes a power supply input terminal coupled to the auxiliary power supply terminal of the first LED set;
    a switching circuit, wherein the switching circuit includes:
        a first switch coupled to the auxiliary power supply terminal of the first LED set and the ground terminal of the second LED set;
        a second switch coupled between the auxiliary power supply terminal of the first LED set and the current input terminal of the second LED set;
        a string controller circuit coupled to control terminals of the first and second switches, wherein the string controller circuit is configured to:
            generate a first control signal to control the first switch to alternately allow current to flow from the auxiliary power supply terminal to the control circuit and shunt the auxiliary power supply terminal to the ground terminal; and
            generate a second control signal to control the second switch to intermittently couple the auxiliary power supply terminal to the current input terminal of the second LED set.

2. The lighting circuit of claim 1, wherein:
    the first switch is open to allow current to flow from the auxiliary power supply terminal to the control circuit; and
    a diode coupled between the first LED set and the power supply input terminal of the control circuit.

3. The lighting circuit of claim 1, wherein the string controller circuit further further comprises a comparison circuit for controlling the switching circuit by comparing an auxiliary power supply voltage at the auxiliary power supply terminal to a threshold voltage, wherein the comparison circuit controls generation of the first in response to a magnitude of the power supply voltage being less than a magnitude of the threshold voltage.

4. The lighting circuit of claim 1, wherein the auxiliary power supply terminal is directly coupled to the power supply input terminal of the control circuit, wherein an auxiliary power supply voltage is determined by a voltage drop across the second LED set.

5. The lighting circuit of claim 1, wherein the switching circuit is controlled by a current controller that controls a current supplied to the plurality of series-connected light-emitting diodes, and wherein the switching circuit is configured to couple the terminal to the power supply input terminal of the control circuit when a voltage supplied across the plurality of series-connected light-emitting diodes is less than a voltage required to forward bias both the first and second LED sets, whereby during operation of the lighting circuit the current is intermittently conducted through the switching circuit to forward bias the first LED set.

6. The lighting circuit of claim 1 wherein the first and second LED sets each comprise a plurality of LEDs.

7. The lighting circuit of claim 6, wherein the the string control circuit is configured to control the second switch to set an illumination intensity of the second LED set.

8. A method of generating an auxiliary power supply for a circuit controlling the transfer of power from an input voltage source to a lighting device comprising plurality of sets of series-connected light-emitting diodes (LEDs) the method comprising:
    controlling a switching circuit to charge a magnetic energy-storing element from the input voltage source and discharging of the magnetic energy-storing element to apply energy stored in the magnetic energy-storing element to the sets of LEDs;

generating an auxiliary power supply voltage supplied to a power supply input terminal of the control circuit from auxiliary power supply terminal of a first LED set of one or more LEDs of plurality of sets of LEDs; and controlling a first switch, coupled to the auxiliary power supply terminal of the first LED set and a ground terminal, with a first control signal to alternately couple the auxiliary power supply terminal to the control circuit and shunt the auxiliary power supply terminal to the ground terminal; and controlling a second switch, coupled between the auxiliary power supply terminal of the first LED set and a current input terminal of a second LED set of one or more LEDs of plurality of sets of LEDs, with a second control signal to alternately couple the auxiliary power supply terminal to the current input terminal of the second LED set.

9. The method of claim 8, wherein the generating further comprises:

comparing auxiliary power supply voltage to a threshold voltage; and setting a state of the first control signal to open the first switch in response to a magnitude of the power supply voltage being less than a magnitude of the threshold voltage.

10. The method of claim 8, wherein the controlling the first switch comprises closing the first switch when a voltage supplied across the plurality of series-connected light-emitting diodes is less than a voltage required to forward bias both the first subset and the second subset of the plurality of series-connected light-emitting diodes.

11. The method of claim 8 wherein the first and second LED sets each comprise a plurality of LEDs.

12. The method of claim 11, further comprising controlling a period of the second control signal to set an illumination intensity of the second LED set.

13. An integrated circuit for operating a lighting circuit comprising a switching power converter and a plurality of a plurality of sets of series-connected light-emitting diodes (LEDs) coupled between an input voltage source terminal and a ground terminal associated with the input voltage source, the integrated circuit comprising:

a control circuit for controlling a switching element of the switching power converter wherein:

the control circuit includes a power supply input terminal coupled to an auxiliary power supply terminal of a first LED set of one or more LEDs of plurality of sets of LEDs;

a switching circuit, wherein the switching circuit includes:

a first switch coupled to the auxiliary power supply terminal of the first LED set and the ground terminal of a second LED set of one or more LEDs of plurality of sets of LEDs;

a second switch coupled between the auxiliary power supply terminal of the first LED set and a current input terminal of the second LED set;

a string controller circuit coupled to control terminals of the first and second switches, wherein the string controller circuit is configured to:

generate a first control signal to control the first switch to alternately couple the auxiliary power supply terminal to the control circuit and shunt the auxiliary power supply terminal to the ground terminal; and generate a second control signal to control the second switch to alternately couple the auxiliary power supply terminal to the current input terminal of the second LED set.

14. The integrated circuit of claim 13, wherein:

the first switch is open to allow current to flow from the auxiliary power supply terminal to the control circuit; and a diode coupled between the first LED set and the power supply input terminal of the control circuit.

15. The integrated circuit of claim 13, wherein the string controller circuit further further comprises a comparison circuit for controlling the switching circuit by comparing an auxiliary power supply voltage at the auxiliary power supply terminal to a threshold voltage, wherein the comparison circuit controls generation of the first in response to a magnitude of the power supply voltage being less than a magnitude of the threshold voltage.

16. The integrated circuit of claim 13, wherein the switching circuit is configured to close the first switch when a voltage supplied across the plurality of series-connected light-emitting diodes is less than a voltage required to forward bias both the first and second LED sets whereby current is intermittently conducted through the switching circuit to forward bias the first LED set.

17. The integrated circuit of claim 13 wherein the first and second LED sets each comprise a plurality of LEDs.

18. The integrated circuit of claim 17, wherein the string controller circuit is configured to control the second control signal to set an illumination intensity of the second LED set.

* * * * *